May 16, 1961
P. E. MERCIER
2,984,501
ARRANGEMENT FOR ABSORBING SHOCKS
PARTICULARLY FOR VEHICLES
Filed May 11, 1956
14 Sheets-Sheet 1
Fig.1
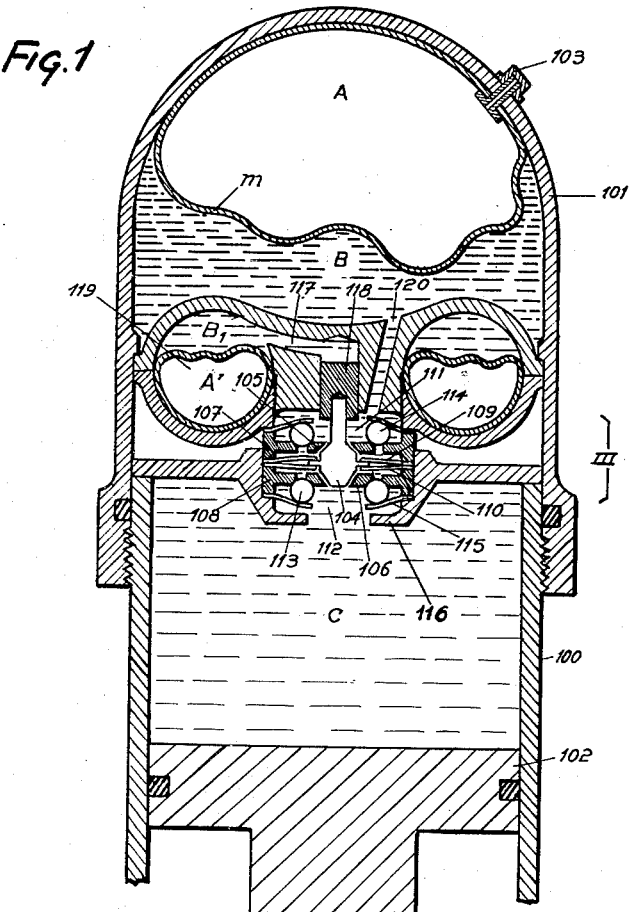
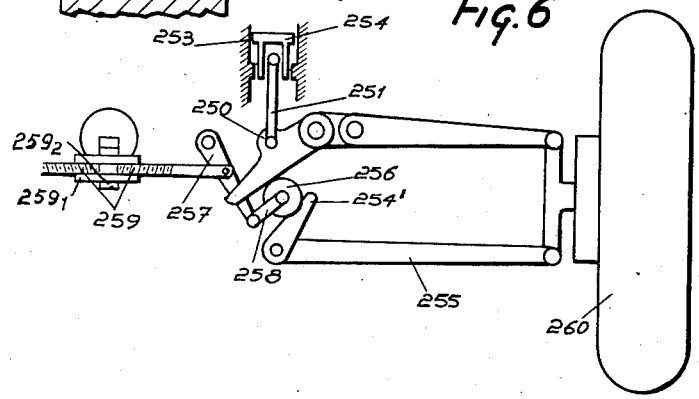
Fig.6
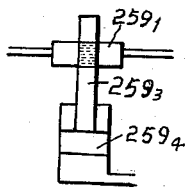
Fig.7
INVENTOR
PIERRE E. MERCIER
BY *Wendroth, Lind & Ponack*
ATTYS.

INVENTOR
PIERRE E. MERCIER

May 16, 1961

P. E. MERCIER
ARRANGEMENT FOR ABSORBING SHOCKS
PARTICULARLY FOR VEHICLES 2,984,501

Filed May 11, 1956

INVENTOR
PIERRE E. MERCIER

BY Wenderoth, Lind & Ponack

ATTORNEYS

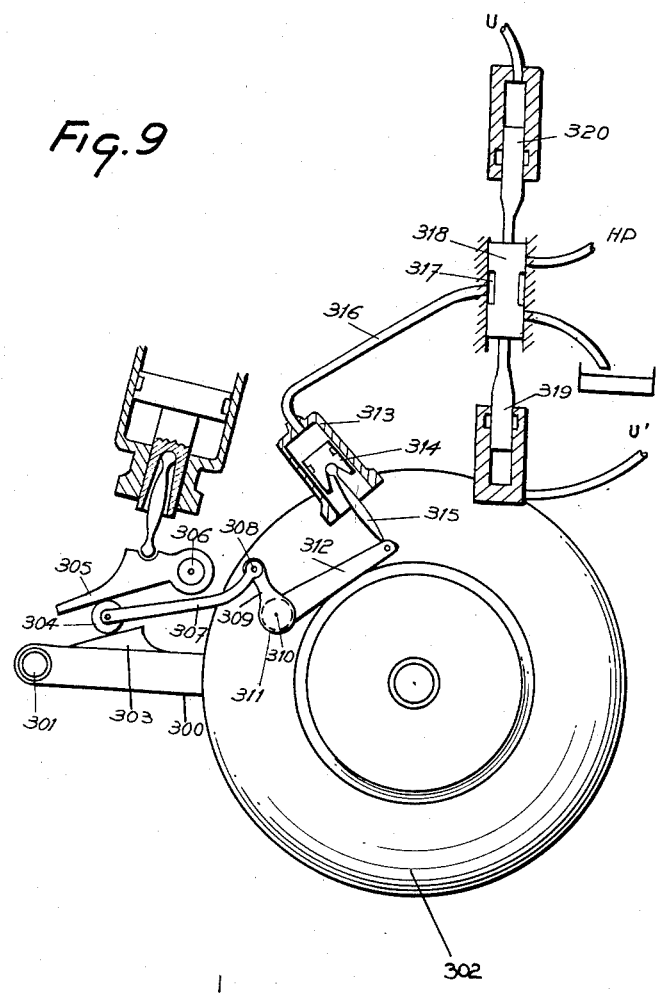

May 16, 1961

P. E. MERCIER 2,984,501

ARRANGEMENT FOR ABSORBING SHOCKS
PARTICULARLY FOR VEHICLES

Filed May 11, 1956

INVENTOR
PIERRE E. MERCIER

BY *Wendewroth, Lind & Ponack*
Attys.

INVENTOR
PIERRE E. MERCIER

INVENTOR
PIERRE E. MERCIER

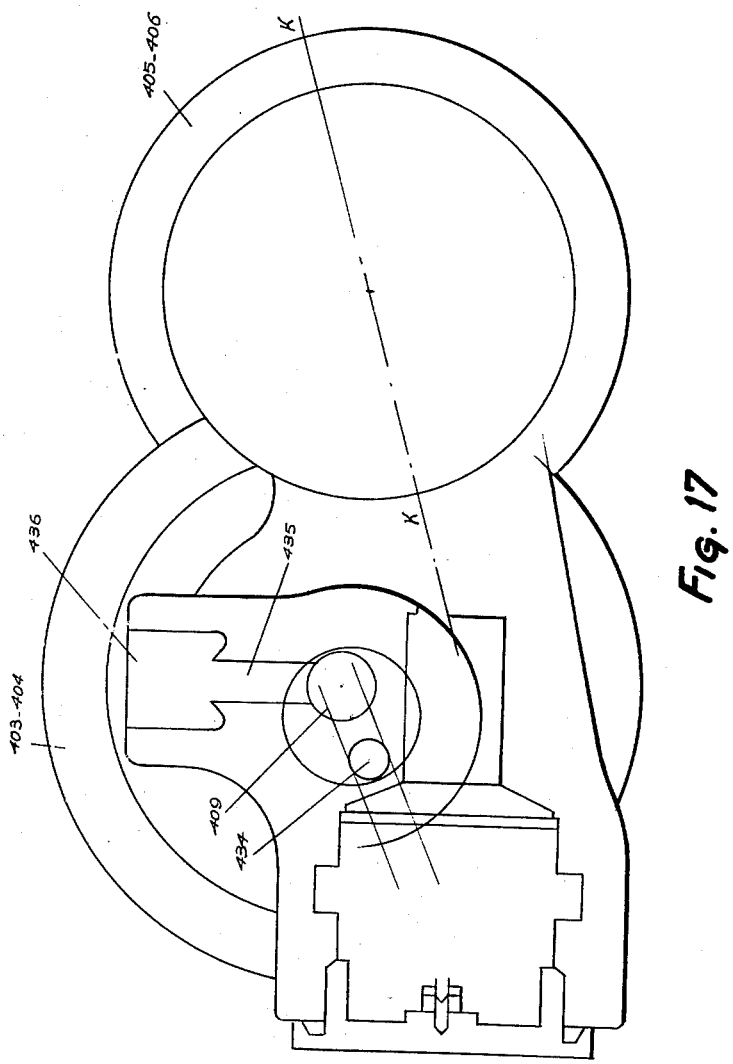

United States Patent Office 2,984,501
Patented May 16, 1961

2,984,501
ARRANGEMENT FOR ABSORBING SHOCKS PARTICULARLY FOR VEHICLES

Pierre Ernest Mercier, Piscop par Saint-Brice, France, assignor to Societe d'Etudes et de Recherches Pour l'Application Industrielle des Brevets Pierre Ernest Mercier, Piscop par Saint-Brice, France Filed May 11, 1956, Ser. No. 584,248

Claims priority, application France July 25, 1955

19 Claims. (Cl. 280—124)

This invention relates to a device for absorbing shocks, particularly in vehicles and the like.

In a vehicle suspension system there are various movements which it is advisable to absorb such as the movements of a low frequency and relatively great amplitude caused by the movement of the body of the vehicle away from the chassis and then the movements of greater frequency such as caused by the oscillations of the wheels.

The absorption of these various movements has led to different solutions which are not always compatible with one another. As a rule, the solutions now used are compromises applied to absorbing slow or rapid movements which are more or less satisfactory.

An object of the present invention is to provide a construction wherein the suspension is more rational and use is made of a liquid forming a part of a resilient medium.

Another object of the invention is to provide a suspension system wherein flexibility in returning the elements to their mean balance position is increased.

A further object of the invention is to provide a suspension system capable of developing a more vigorous damping effect for fluid displacements beyond that produced by the wheel shock absorbers which correspond to the oscillation frequencies of the wheel.

A still further object of the invention is to provide a suspension system wherein the mean balance pressure is adapted to the load or the travel of the suspended mass so that movements of the suspended mass when it deviates from its mean balance position are only essentially braked by the variations in pressure of the resilient medium and the return movements of such mass towards its mean balance position are essentially braked as a function of the difference between the pressure of the resilient member and the mean pressure set up in the damping member for different loads.

With the above and other objects in view which will become apparent in the detailed description below, several embodiments of the invention are described and shown in the drawings in which:

Figure 1 is a partial cross sectional view showing the top part of a suspension member.

Figure 6 is a diagrammatical elevational view showing a mechanical solution for the displacement of the pitch oscillation axle.

Figure 7 is a diagrammatical view of a detail.

Figure 9 is a diagrammatical view with parts in cross section showing a further modification for displacing the pitch oscillation axle.

Figure 10 is a diagram showing certain of the resilient characteristics of the suspension shown in Figures 8 and 9.

Figure 17 is a diagrammatical view illustrating a modification of the arrangement of the pilot resilient container with relation to the head of the suspension member.

In the various views similar reference characters indicate like parts.

Figure 2:
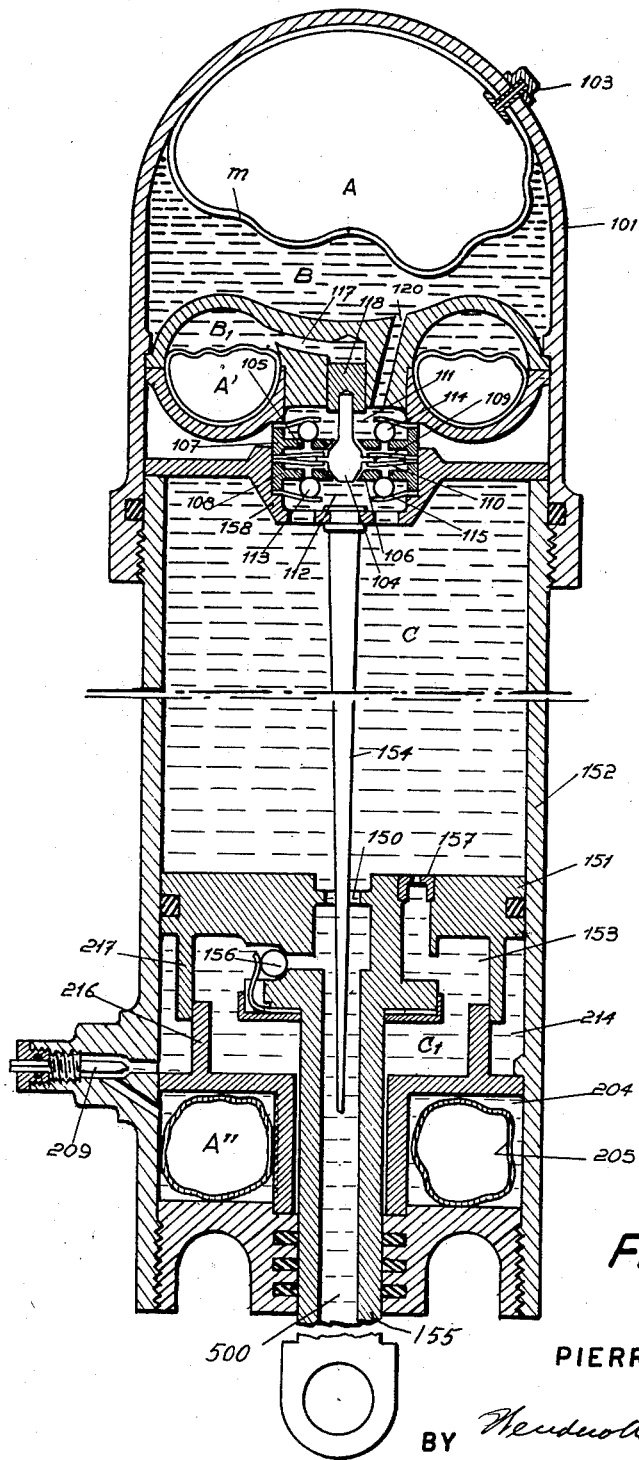
Figure 2 is a similar view of a modification.

Figures 1 to 4 inclusive show suspension members for transmitting suspension stresses between the chassis and the arms carrying the wheels, the suspension members comprising a hydraulic shock absorber having a flexible distortable membrane positioned between the liquid in the shock absorber and a volume of compressible gas.

The objectives sought are an increase in flexibility in the return movements of the elements to their mean balance position and a stronger damping effect when needed.

In the form of the invention shown in Figure 1, the suspension member comprises a body formed of a cylinder 100 and a cap 101 therefor. A membrane M located within the cap 101 divides it into two chambers A and B. The chamber A contains a gas under pressure acting as a spring. Gas may be introduced therein through the valve 103.

The chamber B contains a liquid subject to the resilient action of the gas in chamber A.

Within the cylinder 100 there is a mechanically distortable space C formed by the cylinder 100 and the piston 102 connected to the suspended mass. The space C contains a liquid subject to the pressure of the gas in chamber A.

Means for checking the damping effects comprises a double valve 104 having two opposed truncated bearings which cooperate with the valve seats 105 and 106 provided in the members 107 and 108 respectively. Between the members 107 and 108 are located the apertured release springs 109 and 110. The chamber between the members 107 and 108 communicates with an upper chamber 111 and a lower chamber 112 through openings provided in the members 107 and 108 controlled by ball flap valves 113 and 114. The springs 115 act upon the flap valves 113 and 114 urging them towards their seats. The opening of the flap valves is limited by the abutments such as 116.

Above these elements for checking the damping there is provided a toric recess partially occupied at $B_1$ by the liquid communicating with the cylinder of the piston 118 through the channel 117 and with the chamber 111 by leakages existing between the piston 118 and the cylinder in which it slides. The piston 118 controls the double valve 104. The toric recess also contains a separation membrane 119 similar to the inner tube of a pneumatic tire containing the auxiliary container A' for a gas. The container A' may be inflated from the exterior through a valve extending through the wall of the body of the suspension member or it may be permanently inflated.

The upper chamber 111 communicates freely with the chamber B through the channel 120 while the lower chamber 112 opens directly into the mechanically deformable cavity C. The various elements mentioned above are maintained in position by locking the cap 101 upon the cylinder 100 by screwing the same thereon with liquid type gaskets. The operation is as follows:

When due to shock the space C is reduced in volume from its normal volume liquid will enter the chamber 112. If the movement is slow as in the case when the chassis moves the liquid driven into the chamber 112 moves the double valve 104 and enters the chamber 111 passing through flap valves 114. The liquid then enters the chamber B by passing through the channel 120.

The pressure in A increases for a sufficient short space of time while the pressure in A' does not alter owing to the throttling provided by the chamber 111 and $B_1$ corresponding to the leaks between the piston 118 and its cylinder. The pressure at B being the same as at A there is a difference in pressure between the chamber 111 and chamber A'. The pressure at 111 being higher than at A' the piston 118 will tend to rise. The upper surface of the double valve 104 will therefore press on seat 105 leaving a free space between the seat 106 and the valve 104. The passage of the liquid from the cavity C into the chamber B is thus free by the opening of flap valves 114 and the space between the valve 104 and seat 106.

When the piston 102 after having reached its maximum penetration in the cylinder 100 begins to descend again towards its normal position liquid must pass from the chamber B to the chamber C. This can only be accomplished by moving the valve 104 and piston 118 downwardly with relation to the seat 105. The displacement becomes stabilized when the difference in pressure between B and C acting on the middle section of the valve 104 balances the difference in pressure existing between A' and 111 which activates the piston 118.

The ratio between the effective section of the piston 118 and the mean section of the valve 104 characterizes the damping percent in the return movement to equilibrium position and the leaks between the piston 118 and its cylinder are very small.

If, starting from equilibrium, there is a movement of the piston 102 which increases the volume of the chamber C, for sufficient slow piston speeds the action would occur in a similar manner to that described. The shock absorber gives only a slight resistance when a deviation from equilibrium takes place and the movement of the liquid only overcomes the resistance during the return to equilibrium position.

If the leaks between the piston 118 and its cylinder are sufficiently great so as to intervene in slow movements, the chambers $B_1$ and A' which only communicate with the main liquid of the suspension device through such leaks would follow the pressure variations of the main resilient mass better as the contractions or expansions of such mass were slower. Therefore there is a variable flexibility wherein the flexibility is greater as the movements are slower which is ideal for comfort and holding the road at high speed.

The effect of variable flexibility with frequency may be obtained by positioning the chamber A" at any point of the suspension member outside of the chambers A' and $B_1$ and particularly by arranging such resilient mass adjacent the main resilient mass A. A "fractional resilient mass" means a division of the principal resilient mass A. It is distinct from such principal resilient mass in the sense that it comprises its own gaseous mass whose pressure acts upon the liquid. It is called an auxiliary resilient mass A".

Referring to Figure 2, in this modification a fractional resilient mass is located on the opposite side of the piston relative to the main resilient mass A.

This modification is especially applicable to the landing gear of aircraft. In such case there is the additional problem of damping the kinetic force of the suspended mass in the event of a forced landing. In order to obtain therefore the maximum work by the compression from beginning to end, it is necessary to superpose upon the resilient force assuring the suspension during the running period, a force of hydrodynamic origin resulting from the throttling across a variable nozzle 150, of the liquid pushed back by the head of the piston.

In this solution the mechanically deformable space comprises a main compartment located between the head of the piston 151 and the valve carrying diaphragm 158 and a secondary compartment varying in a reverse direction to the preceding and formed by an annular space provided around the piston rod 155 towards the head of the piston 151.

In order to achieve a variable nozzle and damping of the short period oscillations which are the wheel oscillations a needle 154 is mounted in the cylinder and penetrates a recess 155 provided in the piston rod. This construction is combined with a system of flexible valves 156 preventing the return of the liquid through the nozzle 150 controlled by the needle. The liquid throttling of the rapid movements is then effected by the jet nozzle 157. The needle 154 is mounted in a partition 158 at the upper portion of the cylinder 152.

The damping of slow oscillations is secured by controlling the liquid displacements between the chamber C and the chamber B containing the liquid. This control is obtained by a valve system 104 and the valves located above the partition 158 which is provided with openings therein to permit the transfer of liquid from the chamber 112 to the chamber 111 and vice versa. The construction above the partition 158 is similar to that of Figure 1.

The fractionated resilient mass A" comprises a membrane 205 extending around the piston rod and located in a recess 204. The liquid in the recess 204 is in communication with chamber C' through a needle valve 209 when the piston 151 is not in a position adjacent its lower position.

The operation of this modification is as follows: PM is the mean pressure in the chambers A and A' and W is the cross section of the main piston. The extension power of the suspension member is $C - PM \times W$. When there is a movement from the normal position in the suspension owing to a movement of the wheel the pressure at C and B is the same or almost the same as the pressure in A. There is a difference in pressure between B and $C_1$ due to the throttle 157.

If the movement is a contraction movement the pressure at $C_1$ is less than the pressure at C and therefore less than at B and A. The last three pressures are substantially the same.

The lowest value that the pressure can have at $C_1$ being zero, the greatest total reaction developed upon an impact is thus $R - P_A \times S$ and in ratio to the load that intervenes without hydraulic braking, $R_0 = P_A \times W$, we have $$R = P_A \times S - R_0 \frac{S}{W}$$

This solution has the advantage of limiting the maximum value of T to a value resulting from the sizes adopted originally such as the cross-section of the cylinder 152, the cross-section of the piston rod 151 allowing for the cross-section of the needle 154, etc.

Upon smaller impacts the pressure at $C_1$ remains between zero and PA. Owing to the communication with $C_1$ by the recess 204 containing the mass A" the effect of the relative pressure drop between C and $C_1$ will be reduced by tendency to expand by A" which is affected by the magnitude of the opening of the needle valve 209 and the needle throttle of the main piston. The reduction in pressure at $C_1$ reduces the quantity of liquid which passes from C towards $C_1$ and increases the pressure in A for the same piston displacement.

The arrangement in Figure 2 with a part of the resilient mass on the other side of the piston with relation to the main mass gives to the mass $A''$ a role opposed to that of the main resilient mass A under rapid movement conditions.

At the end of the expansion when the expansion or contraction speeds become reduced only the action of the needle valve 209 can intervene in the required manner if its opening is sufficiently narrow and in this case the effect of locating the mass $A''$ opposite the piston is less appreciable for high contraction or expansion speeds.

Finally in addition to the advantage indicated above with regard to rapid oscillations, it may be desirable in order to prevent the vehicle from being inclined forwardly at the moment the brake is applied and the raising towards the rear, to eliminate all intervention of the elastic fractionated mass in the static flexibility of the ensemble.

In such case a check valve could stop all passage between the chambers $A''$ and $C_1$.

Finally in order to avoid a bumping effect at the end of the expansion a small collar 216 provided on the piston 151 encloses with the collar 217 adjacent the maximum expansion the deformable space 214 capable of opening when the rings 216 and 217 are no longer in contact because of an extension, of such kind, that the space 214 communicates with the space $C_1$. This space 214 is closed when the rings 216 and 217 are in contact, that is to say when the spaces 153 and $C_1$ have ceased to communicate with the space 214.

If we combine the two improvements mentioned, the second one only comes into action if the needle valve 209 is open.

Figure 3:
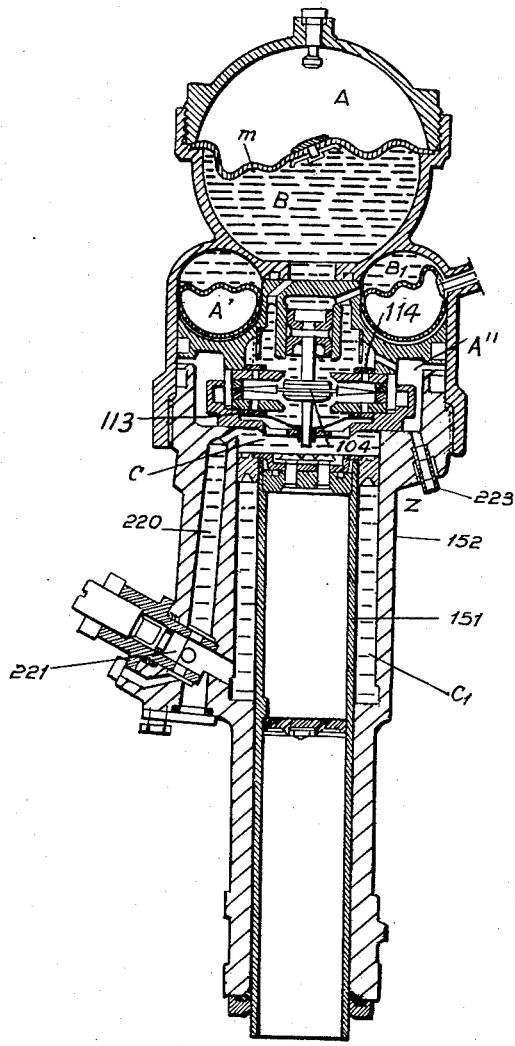
Figure 3 is a cross sectional view of a further modification of a suspension member.
Figure 4:
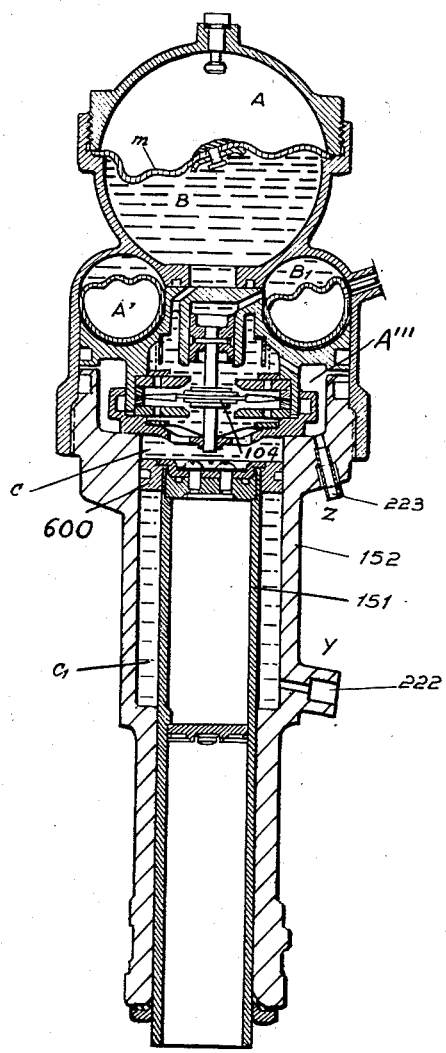
Figure 4 is a view similar to Figure 3 illustrating a further modification.

The modifications shown in Figures 3 and 4 are used in the complete suspensions described below. The constructions shown are mainly similar to those previously described. They show the chambers A, A', B, $B_1$, C and $C_1$ as well as the valve 104 while the flap valves 113 and 114 are flat.

In Figure 3, 221 is a throttle valve interposed in the canal 220 extending between the capacity $C_1$ and the capacity C.

The construction in Figure 3 is similar to that of Figures 1 and 2 but in addition has a capacity $C_1$ located around the mechanically deformable space C and separated therefrom by the piston 151 which is connected to the suspended elements.

This annular capacity $C_1$ is provided between the piston rod and the wall of the cylinder in which the piston moves. It is deformed in an inverse direction from the capacity C so that if the piston 151 rises the capacity C diminishes and the capacity $C_1$ increases and vice versa. The control canal 220 controls by the spring valve 221 the communication between the capacities C and $C_1$ which are inversely deformable.

In the modification shown in Figure 4 such a direct intercommunication is not provided. The piston head 151 is provided with a liquid tight gasket or similar means to prevent decantation of the liquid by leaking from C to $C_1$. The exterior wall of the cylinder 152 is provided with an inlet 222 for the input and output of liquid into the annular space $C_1$. This is independent of the piping 223 arranged under the membrane $m$ separating the gas under pressure from the liquid in the main cavity B. The inlet 222 is provided upon the construction shown in Figure 3 also.

Figure 5:
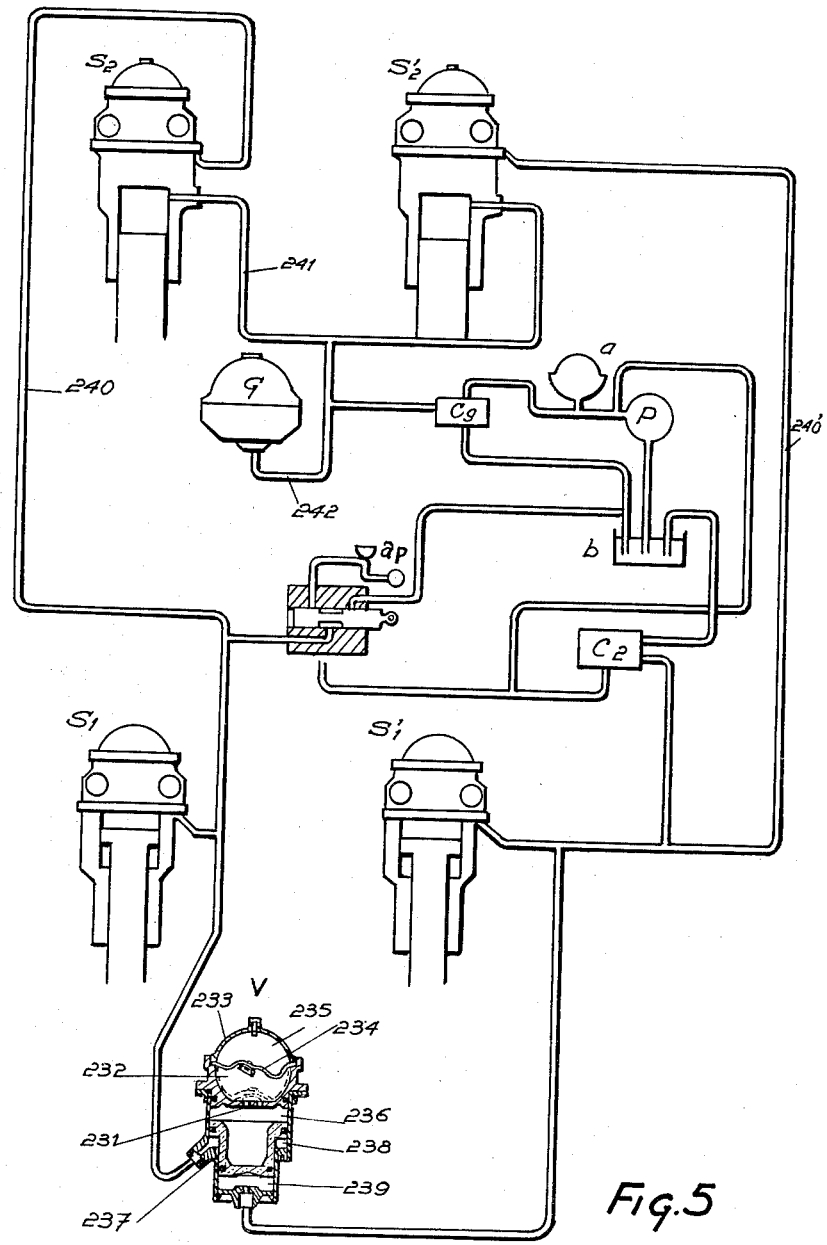
Figure 5 is a diagrammatical view showing a complete suspension system.

In Figure 5 a complete suspension system is disclosed wherein there is provided an additional vertical flexible member V. The member V comprises a container 233 which is divided into two compartments by the membrane 234 which separates the gas under pressure in compartment 235 from the liquid under pressure in compartment 232. The liquid in 232 is subjected to the same pressure as the pressure prevailing in 235 in normal operation when the membrane 234 is not completely pressed against the portion of the wall of the container 233 opposite the compressed gas. A mechanically deformable space 236 which is filled with liquid and in communication with the liquid in 232 is formed by a stepped piston 237 moving in a cylinder having two coaxial cylindrical walls of different diameter so constructed that the cross-section of the annular space 238 corresponds to the cross-section of the small cylinder 239.

As stated, each element V comprises an elastic membrane 234 separating the compressed gas in the space 235, from the liquid filling the chamber 232. The floating piston 237 separates the liquid of the chamber 236 into liquids filling the annular chamber 238 and the cylindrical chamber 239. The liquids in the chambers 239 and 238 arriving respectively by two distinct liquid circuits indicated at 240 and 240' corresponding to the suspension elements of the wheels on each of the sides of the vehicle.

The piston 238 is in two stages, that is to say, it comprises a first cylindrical section flowing in the cylinder 238 and a second cylindrical section of greater diameter flowing in the cylinder 236. It provides with the bottom of the cylinder an annular space 238.

The piston 238 with two stages is in equilibrium between, on the one hand, two forces formed by the pressures in the cylinder 239 and the annular chamber 238, and on the other hand, a force opposed to their resultant and which is constructed by the pressure arriving from the liquid in space 236.

Airtight elements are inserted between the two staged piston 237 and the walls of the cylinder.

The nozzles 231 are provided between 232 and the variable space 236. They may accommodate hydraulic throttles of the jet type, calibrated flap valves or they may be simple perforations as shown in order to accomplish the function.

Figure 8:
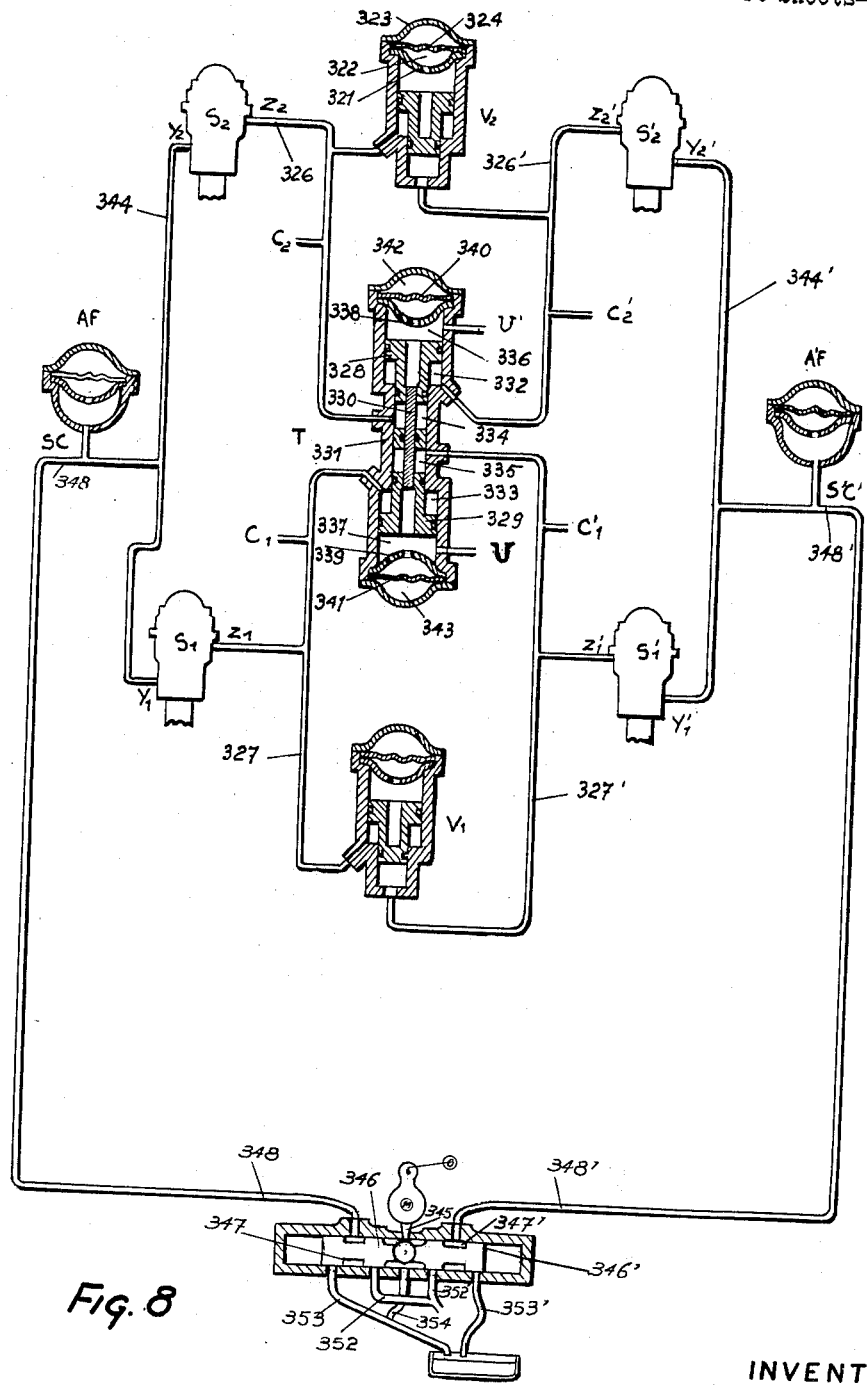
Figure 8 is a diagrammatical view with parts in cross section showing a complete suspension system.

Auxiliary resilient containers having a membrane separating a liquid and a gas at the same temperature are shown at G in Figure 5 and at AF and A'F' in Figure 8.

The construction shown in Figure 8 also utilizes members similar to the member V of Figure 5 but in which the staged pistons are mechanically connected to one another so that any movement of one involves an inverse movement of the other with respect to their respective resilient chambers. A structure of this type is shown at T in Figure 8.

Figure 8A:
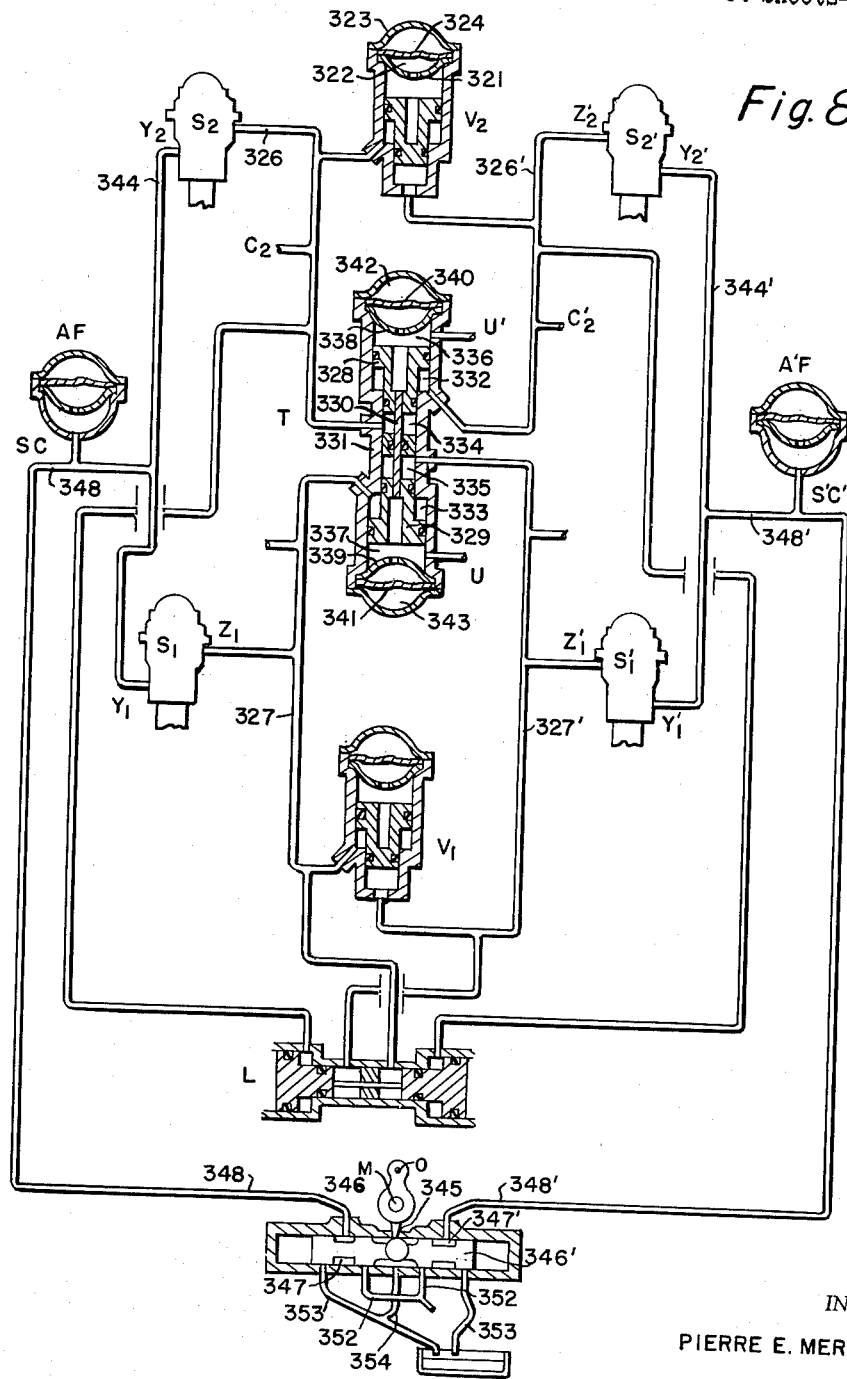
Fig. 8A is a diagrammatical view with parts in cross-section showing a suspension system.

Finally the invention uses a hydraulic device similar to the foregoing wherein two staged pistons are connected to one another but not comprising antagonistic resilient members. Such a device is shown in Figure 8A at L.

In addition to the main elements described the improved suspension is provided with regulating devices which will be described below. These devices are intended either to compensate for liquid losses due to accidental leaks or to allow for pressure variations in the gases used because of temperature variations, or to regulate the load conditions or to make allowances for ground variations over which the vehicle travels.

These regulating members are preferably formed quite similar to $C_g$, $C_1$ and $C_2$ of Figure 5 and essentially comprise a slide valve or a flap valve device for either evacuating a portion of the liquid towards the liquid recovery tank $b$ or admitting liquid pressure into the system from a hydraulic source which may comprise an accumulator $a$, and a pump P. The pump P which is preferably self-regulating may be driven in any desired manner.

In Figure 5 for the sake of simplicity, these regulating members except the element $C_1$ are diagrammatically shown. The slides of the regulating elements $C_1$ and $C_2$ are mechanically subjected to the sinkings of the wheels corresponding to the suspension elements $S_1$, $S'_1$. The slide of the corrector $C_g$ is subjected mechanically to the sinking means of the elements carrying the wheels corresponding to the suspension elements $S_2$, $S'_2$ (Figure 5).

Some examples of the suspension systems according to the invention will now be described.

Example I

Referring to Figure 5 the suspension elements $S_2$ and $S'_2$ are of the type shown in Figure 2 and are applied to the two wheels upon the front or rear axles of the vehicle while the other two wheels are equipped with elements of the opposite type $S_1$ and $S'_1$ as shown in Figure 3. The mechanically distortable spaces C located above the pistons 151 of the suspension elements corresponding to the wheels located at the same side are interconnected by a separate piping 240 and 240'. To this piping there is connected a pressure regulator-corrector $C_1$ and $C_2$ and on the other hand, one of the two annular chambers 238 or cylindrical chamber 239 of the member V.

Finally for the two front or rear wheels which have the $S_2$ and $S'_2$ type of suspension member in which the mechanically deformable space $C_1$ is completely isolated from the mechanical deformable space C which is above the piston 151 there is provided a hydraulic intercommunication between such annular spaces and in the interconnection there is provided a container G. The container G is divided by a membrane separating a gas under pressure and a liquid connected to the hydraulic interconnection 241 by a pipe 242 having throttling means therein.

Also connected to this interconnection the longitudinal trim correcting device $C_g$ whose slide valve is controlled by a detecting mechanism for ascertaining the difference of the average sinking of the front and rear wheels. Such a detecting mechanism may be of various types.

The operation of the suspension described is as follows:

A vertical displacement of the suspended mass gives rise to intervening flexibilities due to the compression of the gases in the elements $S_1$, $S'_1$, $S_2$ and $S'_2$ and also in the vertical flexible container V.

The flexibility corresponding to the relative sinking between the front pair of wheels with relation to the rear pair of wheels may be achieved so that it does not have much effect when the vehicle is fully loaded. In other cases, there is a coupling between the vertical flexibility and the pitching movement which is only slightly perceptible in the center of the vehicle.

The additional vertical flexibility member V does not act in the changes of longitudinal trim corresponding to a pitching movement of the suspended mass.

It is necessary to avoid the variations of the loads transmitted by the wheels because of unevenness of the ground. The unevenness of the ground does not involve any kind of load variations transmitted by the wheels to the chassis as hydraulic corrections always act on either the transverse or longitudinal pairs of wheels and only because of the intervention of the sums or differences of the elongations of symmetrical pairs of wheels or those situated on the same side of the vehicle.

Instead of utilizing exclusively hydraulic methods like those that have just been described, correction of the longitudinal trim of the vehicle may be effected by a mechanical process displacing the pitch oscillation axis so as to make it coincide with the transversal vertical plane containing the center of gravity. This arrangement has the advantage, whatever may be the load conditions of the vehicle, to eliminate all torque between vertical oscillations of the center of gravity and pitching movements of the suspended mass.

An example of such a mechanical construction which permits varying the arms of the lever by which a pair of front or rear wheels operates the corresponding suspension elements, is shown in Figure 6, in which the lever 250 operating through the link 251 the piston 254 of the suspension element 253 finds itself controlled by the lever 254' fixed angularly to the wheel carrying arm 255 through the intermediary of the multiple roller 256 whose position can be controlled as desired by means of the lever 257 and the shackles 258. The lever 257 is connected by a rod of variable length 259 having right and left hand threads whose length can be hydraulically controlled. For example, the turret $259_1$ presents exteriorly a right angular tooth $259_2$ operated by a linkage $259_3$ carried by the piston rod $259_4$ of the jack (Figure 7). This solution, given by way of example, is applied to a chassis with transverse wheel carrying levers. The variations of the links can be controlled entirely also by an electric motor or any other driving agent available for operating the turret $259_1$ or the linkage $259_3$ by the wheel with a tangential screw.

It is quite evident that any displacement, more or less parallel to the levers, of the multiple roller 256 intercalated between them inversely varies the respective lengths of these levers and hence modifies the displacement ratio of the piston 254 in relation to a vertical displacement of the wheel 260.

Example II

A more complete solution is shown in Figures 8 and 9.

Although it is possible, by hydraulic methods, to effect the displacement of the pitch oscillation axis, so as to bring it, under all load conditions, into the transversal plane containing the center of gravity, the mechanical solution, which enables the variation to be obtained of the lever arm for one of the pairs of front or rear wheels according to which the hydro-pneumatic members are engaged, has the advantage of securing a simple achievement of trim correction or anti-centrifugal correction.

Figure 9 shows a construction that is equivalent to that shown in Figure 6 in the case of the longtiudinal arms carrying the wheels generally used for the rear wheels.

A wheel-carrier arm 300 articulated on to the chassis by a transversal axle 301 holding the wheel 302 comprises the cam 303 facing which the multiple roller 304 is intercalated, also in contact with the cam 305 pivoting around the axle 306 carried by the chassis of the vehicle and parallel to the axle 301. The shackle 307, whose end is articulated on the axle of the multiple roller 304, revolves, by its opposite end 308, on an axle carried by the lever 309 articulated on the chassis by the axle 310 and preferably connected to a symmetrical member of the other side of the vehicle by a tube shown by a dotted line 311 centered on the axle 310.

At any point of this tube 311, a control lever 312 is fixed, which is itself controlled by a jack 313, whose piston 314 is connected to the end of the lever 312 by the small connecting rod 315. The jack chamber 313 is connected by piping 316 with the central neck 317 of a slide-valve 318 in equilibrium between two pistons 319 and 320 acting antagonistically, whose chambers are connected at U and U' to a member that will be described later.

If the jack 313 is single-acting (case of Figure 9) the roller 304 is only assured in a positive manner if an elastic force is applied to the lever 312 in a way antagonistic to the action of the piston 314 of the jack 313. This elastic antagonistic force is assured by a torsion bar centered upon the axis 310.

Figure 8 shows diagrammatically the hydraulic connections occurring between the four suspension members $S_1$, $S_2$, $S'_1$, $S'_2$ corresponding to the four wheels of the vehicle.

The mechanical connections directly linking up the pistons to the wheel-carrier arms or levers integral with the wheel-carrier arms or other mechanisms such as those of Figure 9, are not shown, for the sake of clearness.

The indices 1 and 2 correspond to the same end of the vehicle, the indices ' differentiate one side of the vehicle from the other.

The mechanical devices shown in Figure 9 or 6 are thus applied either to the suspension members $S_1$, $S'_1$ or to the suspension members $S_2$, $S'_2$, the other members being directly connected by their connecting-rods or wheel-carrier levers.

The four members $S_1$, $S'_1$, $S_2$, $S'_2$ of Figure 8 are of the type of Figure 4, i.e., the mechanically distortable space $C_1$ is situated between the piston heads 600 and the piston rods 151 of the suspension members and is not in hydraulic connection with the mechanically distortable spece C situated in opposition to the piston rods with regard to the piston heads.

Figure 8 shows diagrammatically for each suspension member, two hydraulic connection pipes, one approximately in the middle of the body of the suspension member corresponding to the points Z (223) of the type of suspension member, Figure 4, the other pipe corresponding to the points Y (222) of the type of suspension member, Figure 4, the other pipe corresponding to the points Y (222) of the type of suspension member, Figure 4.

Apart from the four suspension members, Figure 8 comprises two members $V_2$, $V_1$ respectively applied to the suspension members $S_2$, $S'_2$ and $S_1$, $S'_1$. These members are of similar structure to that of the member V shown in Figure 5, i.e., they comprise a piston whose transversal annular section is equivalent to the reduced circular section, the mechanically distortable space situated in opposition to this reduced circular section being filled with liquid in communicaton by nozzles such as 321 with a portion 322 of the pseudo-spherical chamber 323 divided by the membrane 324 separating the gas compressed in the enclosure 323 from the fluid occupying the space 322.

The reduced annular and cylindrical cavities of the members $V_1$ and $V_2$ are connected by piping such as 326, 326', 327, 327' to the points $Z_2$, $Z'_2$, $Z_1$, $Z'_1$ shown in Figure 1 of the suspension members $S_1$, $S'_1$, $S_2$, $S'_2$.

There is diagrammatically shown on this piping at $C_1$, $C'_1$, $C_2$, $C'_2$, the outputs of the position corrector piping of the suspension members which essentially comprising the members shown diagrammatically under the letters C, G, a, P, b of Figure 5, namely, a slide-valve controlled by the downward movement of the wheel fed by the hydraulic power source of the suspension comprising an accumulator a, a pump P and liquid return tanks b, said slide-valve being able to admit the liquid under pressure coming from the power source in the event of the subsidence of the suspension member in question or to evacuate the liquid going towards the tank should that member become extended. These different cases respectively correspond to an increase in the load borne by the suspension member, or, on the other hand, a reduction of that load or to compensate for leakages or thermic dilatations.

In addition to the members $S_1$, $S'_1$, $S_2$, $S'_2$ a supplementary member T shown in Figure 8, is connected to the piping 326, 326' 327, 327'. This member T comprises two staged pistons 328, 329, integral in their displacements by the rod 330, both moving in the body 331 delimiting four chambers with them, two annular chambers 332 and 333 and two reduced cylindrical chambers traversed by the rod 330 marked respectively 334 and 335. The two chambers corresponding to the same piston are connected to symmetrical piping such as 326, 326' or 327, 327'. The straight sections of the reduced annular and cylindrical chambers are equal.

Lastly, the mechanically distortable space situated in opposition to the staged pistons and marked 336, 337, comprise pipes whose beginnings are indicated at U and U'.

These spaces 336, 337, by a nozzle such as 338, 339, are in connection with the liquid situated in opposition to the gas compressed under the separating membranes 340, 341 of the compressed gas caps 342, 343. The piping shown at U and U' are connected to the piping shown under the same letters in Figure 9.

On the other hand (see Fig. 8A), the piping 326, 326', 327, 327' are connected to a member L similar to the member T previously described, but with this difference that for these pipes there are no hydropneumatic caps such as 337, 343, 336, 342, and that the hydraulic connections are crossed, the suspension members of two wheels on a diagonal being applied to a staged piston, the two other suspension members being applied to the other staged piston.

Lastly, for the wheels situated on the same side of the vehicle, the points $Y_1$ and $Y_2$, $Y'_1$, $Y'_2$ are connected respectively by the piping ats at 344, 344' to hydro-pneumatic caps marked AF, A'F' similar to those already encountered on the members $V_1$, $V_2$ and T and a centrifugal corrector inserted at SC, S'C' shown at the bottom of Figure 8 on a larger scale.

Figure 8 also shows, in combination with S'C' and SC, the pendular mass articulated around the axle O parallel to the longitudinal axis of the vehicle and playing the part of a centrifugal detector. This mass M, through the finger 345, engages the double slide-valve 346', 346 whose necks 347, 347' are in communication by the piping 348, 348' with the piping 344, 344'.

Furthermore, the slide-valves 346, 346' are connected by the piping 352, 352' with the high pressure source of the hydraulic power unit and by the piping 353, 353' with the tank as well as the central leakage return piping 354.

The operation of the above is as follows:

As in the solution diagrammatically shown in Figure 5, the vertical flexibility of the vehicle brings into play the resilience of the compressed gas chambers of the four members $S_1$, $S'_1$, $S_2$, $S'_2$ and that of the members $V_1$, $V_2$. But the resilience of the members AF, A'F' which acts on the annular space situated under the piston rods of the suspension members $S_1$, $S'_1$, $S_2$, $S'_2$ normally withdraws itself from the resilient action in question. Thus, owing to this superimposition, we have a flexibility characteristic with double curvatures as a result, so that the flexibility diminishes when it comes towards the end of the stroke (Figure 10). This is valuable from the standpoint of comfort and holding the road.

Moreover, this arrangement, through the intermediary of the pendular mass M, enables, in the presence of transversal acceleration, to preserve the trim of the vehicle in relation to the resultant of said transversal acceleration and of ground inclination.

Actually, when the vehicle rests on a horizontal plane and is subjected to no transversal acceleration component, the pressure prevailing in each of the chambers AF and A'F' is the same.

When the mass M is urged towards the left, the double slide-valve also moves towards the left and the chamber 347 puts the piping 348 into communication with the tank return, whereas the chamber 347' puts the piping 348' into communication with the high pressure. This means that the resultant resilient power, sustaining the suspended mass on the left side, is increased by the fact of the diminishing of the pressure of the member AF, whereas the resilient power sustaining the suspended mass on the right side is reduced owing to the increased pressure in the member A'F'.

As soon as this antagonistic action corrects the trim of the vehicle the mass M resumes its position of repose with relation to the chassis, also the double slide and all transfer of liquid is interrupted.

Independently from the automatic correcting mechanism of transversal accelerations, the members $V_1$, $V_2$ only intervene in vertical flexibility enabling a higher transversal rigidity to be adopted than that of an ordinary vehicle.

Lastly, the member T of Figure 8 forms an additional pitching flexibility owing to the fact that it permits a decanting of the liquid circulating in the piping 326, 326' on the one hand, and the piping 327, 327' on the other hand.

Said decantation is resiliently controlled by the resilience of the gaseous masses situated in the chambers 342, 343.

When the integral staged pistons 328 and 329 occupy a middle position, the gas pressures occupying the cavities 342 and 343 are equal, but the position of the membranes 340 and 341 is such that one or the other of these membranes, for the required displacement of the integral staged pistons, comes into contact with the cups which limit their extension and carry the nozzles 338, 339, said displacements of the integral staged pistons being less than their maximum stroke.

In this case, an additional flexibility is obtained of the pitching movement of the suspended mass with increasing characteristics when the extreme positions are approached.

The automatic displacement of the pitching axis is found to be ensured by the mechanism of Figure 9 in the following manner; the operating jack 313 which controls the position of the multiple roller 304 is actually operated by the slide-valve 318, which is itself subjected to the antagonistic actions of the pistons 319 and 320 connected respectively to the piping at U and U'.

As soon as the double integral pistons 328, 329 quit their motionless position, the pressures in the caps 342 and 343 differentiate and the slide-valve 318 is actuated.

It is assumed, for example, that the double pistons 328, 329, move downwards, the pressure transmitted by the piping U is greater than the piping U', the slide-valve 318 also moves downwards in the case of Figure 9. The annular chamber 317 puts the jack chamber 313 into communication with the tank. The piston of the jack 313 descends in its cylinder, the roller 304 comes closer to the articulation 301. The lever arm of the wheel 302, in relation to the corresponding suspension member $S_2$ increasing, the pressure of the integral staged pistons 328, 329 increases.

It is thus sufficient to throttle the passage of the liquid coming from the jack 313 in a suitable manner, in order that the displacements of the piston 314 should only be slightly influenced by the oscillations of the wheels.

It is remarkable that the automatic adjustment of the lever arm by the members shown in Figure 9 and which maintain the pitching axis in the transversal plane containing the center of gravity, automatically ensures a correct distribution of the anti-rolling rectifying torque between the rear and front wheel-carriers.

Likewise, the members diagrammatically shown at $C_1$, $C'_1$, $C_2$, $C'_2$ which have the purpose of maintaining at their mean value the depression of the corresponding wheel-carrier member $S_1$, $S'_1$, $S_2$, $S'_2$ will be established with still greater throttlings than the previously mentioned throttlings, so as to cause a sufficiently great time constant to intervene in relation to the adjustment time of the pitching axis so that no coupling phenomena takes place between the two types of correction.

In short, the passage sections and nozzles of the piping intervene in the various correctors previously described, and are such that the time constants between the three types of correction are as separate from each other as possible, the lowest time constants corresponding to centrifugal acceleration corrections, the second to the displacement and adjustment of the pitching axis, and the third to the respective depressions of the various wheel-holder members.

The element L decants the liquid coming from the elements of S of the two wheels located according to a diagonal of the vehicle towards the elements of S of the two wheels located upon the other diagonal.

*Example III*

Figure 11:
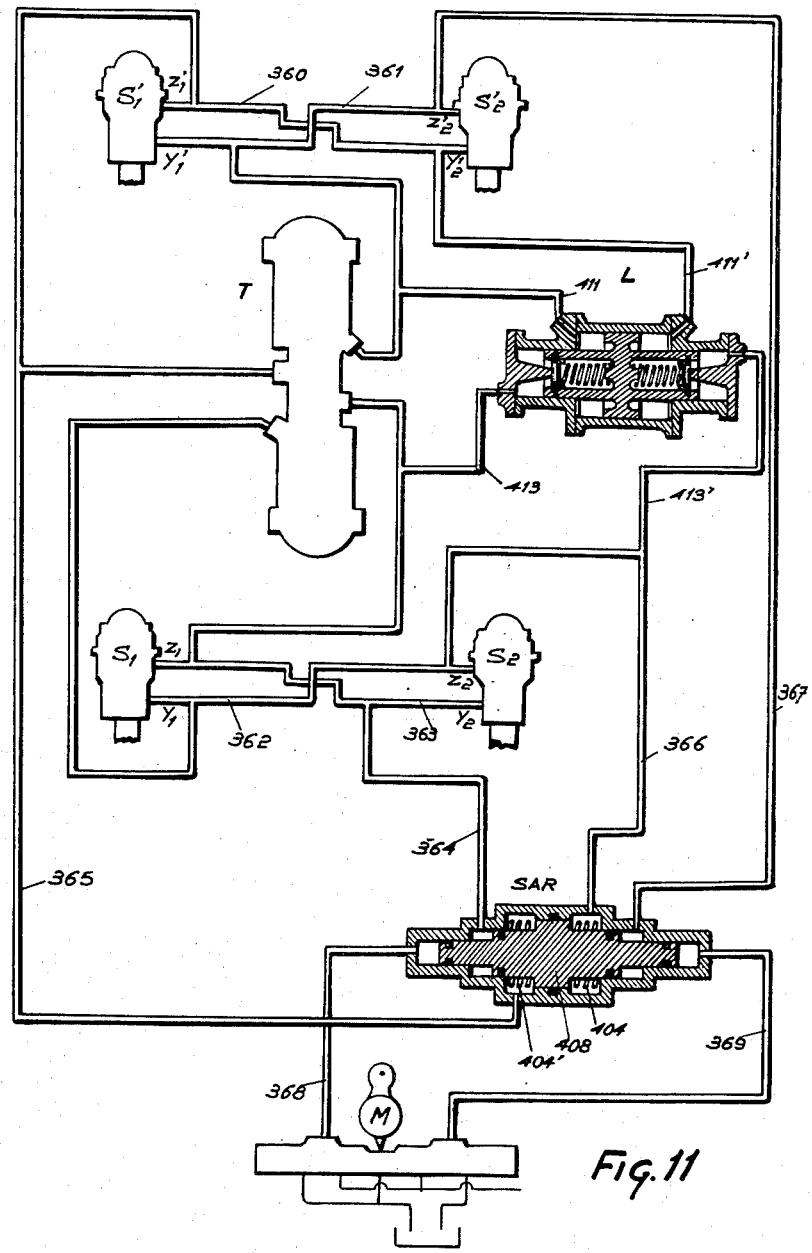
Figure 11 is a diagrammatical view with parts in cross section of a further modification of a suspension with crossed intercommunication wherein an automatic displacement of the pitch axle of any type may be used.

A third solution of the invention is shown in Figure 11. This solution offers, as compared with the previous solution, a certain amount of simplification, at the expense of renouncing the flexibility characteristics resulting from double curvature for vertical movements of the suspended mass. A strengthened anti-rolling is actually obtained in this type of solution, by interconnecting, level with the same pair of wheels, whose axes are situated in the same transversal plane of the vehicle, under caps and annular chambers of the suspension members $S'_1$, $S'_2$ and $S_1$, $S_2$ on either side of the symmetry plane of the vehicle by the pipings 360—361 and 362—363.

For symmetrical vertical movements of the suspended mass, the suspension members of the type of Figure 4 behave as if they were of the type of Figure 3, whereas for lateral sloping movements (rolling) of the suspended mass, the interconnection in question increases the resilient resistance offered to rolling. Actually, by presuming that the members $S_1$, $S'_1$ subside under the effect of a transversal force, the annular chambers B of these members increase in volume and call on the liquid coming from the upper chambers A''' of the members $S_2$, $S'_2$. This results in a lowering of pressure in said members which is added to that which may result from an extension of these members $S_2$, $S'_2$ under the effect of the same transversal force. To this effect is added the effect following the reduction in volume of the annular chambers of the members $S_2$, $S'_2$ and the increase in the attendant pressure in the upper chambers of the members $S_1$, $S'_1$. Thus, there is distinctly, by the superimposition of these decanting effects, an increase in rigidity to rolling, and this to an extent that is so much the more appreciable as the annular chambers B of the suspension members are larger.

The complete diagram of the suspension comprises (Figure 8A) a member L, allowing of free swerving, and a member T similar to that of the preceding sunspension (Figure 8).

Lastly, the anti-roll controlled by a servo-motor requires a member designated SAR essentially comprising a lower floating piston 408 which can be returned by resilient means such as the springs 404, 404', to its normal symmetrical position, this piston delimits two groups of at least three cavities, varying in opposition group by group, one pair of supplementary opposed cavities being able to be provided for ensuring the resilient return. Two of the cavities of a group are connected by pipings 364—365 to the upper chambers of the member $S_1$, $S'_1$ and two cavities opposite to the other group are connected by the pipings 366—367 to the upper chambers of the members $S_2$, $S'_2$.

The member L may also comprise a recoil spring in an effective middle position, especially at the moment of filling the pipings or compensating for leaks, either automatically, or by hand.

It should be pointed out that Figure 11 does not show the longitudinal trim correcting devices, in order to simplify the figure. It goes without saying that they can be effected in a similar or identical manner to that of Figure 6 and Figure 9. In this connection, there is nothing to distinguish this embodiment from trim correction means in depth as compared with the displacement solution for pitching axis shown in Figure 6 and that of Figure 9. And without going outside the scope of the invention, it would be just as easy to exchange the two types shown in Figures 8 and 11. Another form of mechanical embodiment could also be combined for the displacement of the pitching axis with one or the other of the solutions described, or any combination of their essential elements.

Lastly, all that has been stated with regard to the time constants of the automatic correcting devices, is still valid for the type of crossed inter-connection suspension shown in Figure 11.

We thus see that the invention should not be limited to the examples described but that, on the contrary, numerous alternatives could be devised without going outside its scope.

The suspension member showed by way of example in

Figures 12, 13, 14, 15 is a suspension member with an increase sloping flexibility in the vicinity of the end of the stroke by the interruption of the connection existing between the principal resilient mass and the supplementary resilient mass or masses that are connected with it. To simplify the drawings, these supplementary masses are not shown and there is simply shown on the suspension member, the point of the coupling piping.

Figure 12:
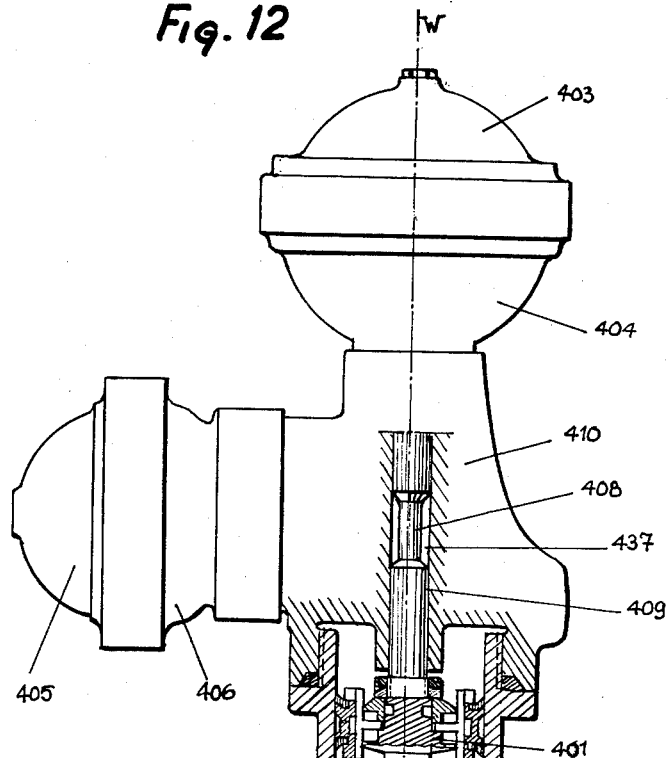
Figure 12 is a partial elevational and cross sectional view of a suspension member.
Figure 13:
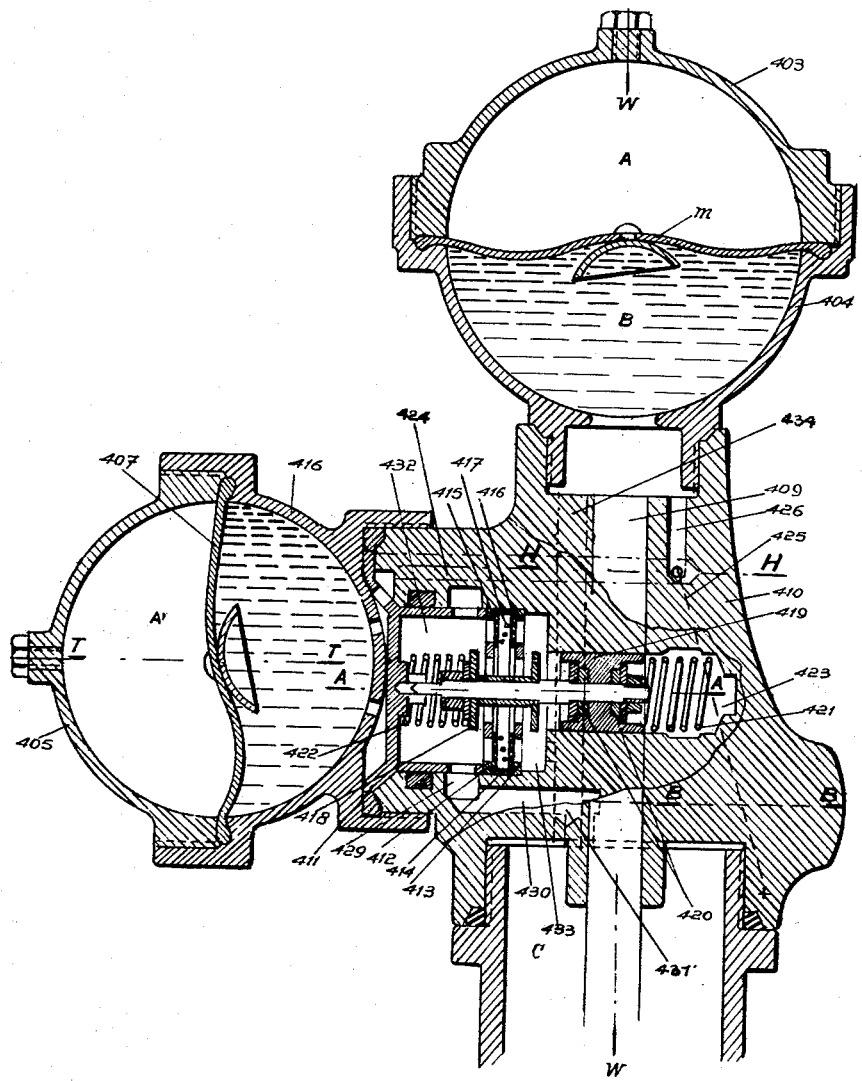
Figure 13 is a cross sectional view of the upper portion of Figure 12 taken on the sectional lines T—T, U—U and T'—T' in Figure 14.
Figure 14:
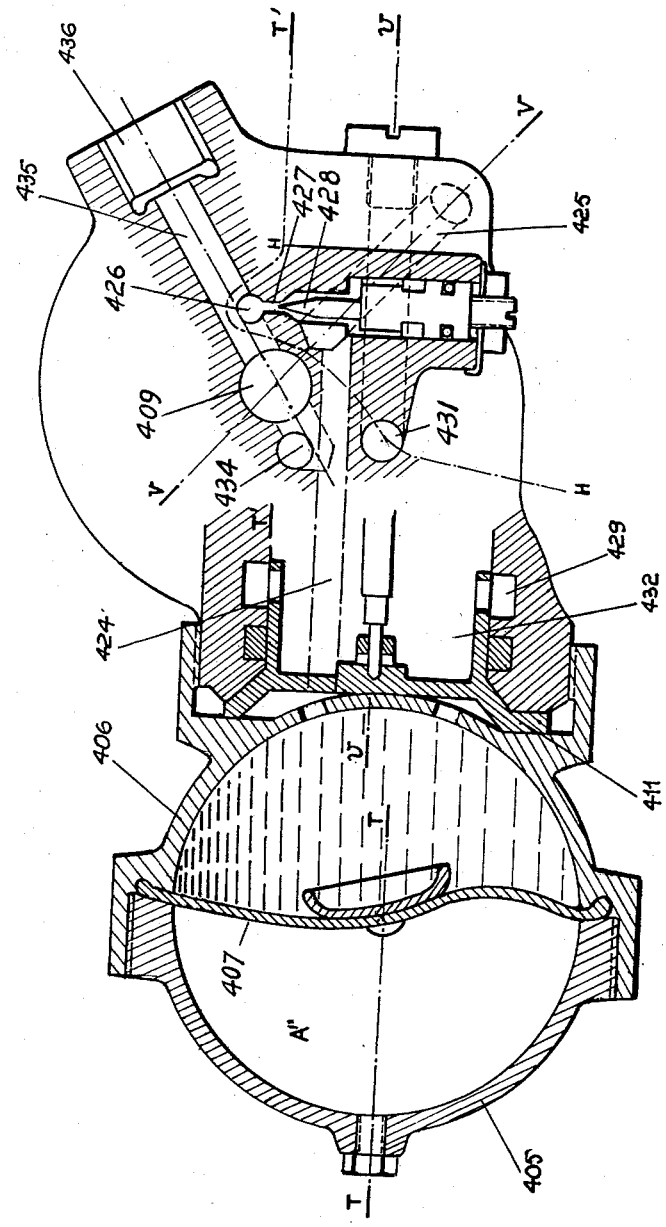
Figure 14 is a cross sectional view taken upon the sectional lines T—T, A—A, H—H and B—B of Figure 13.
Figure 15:
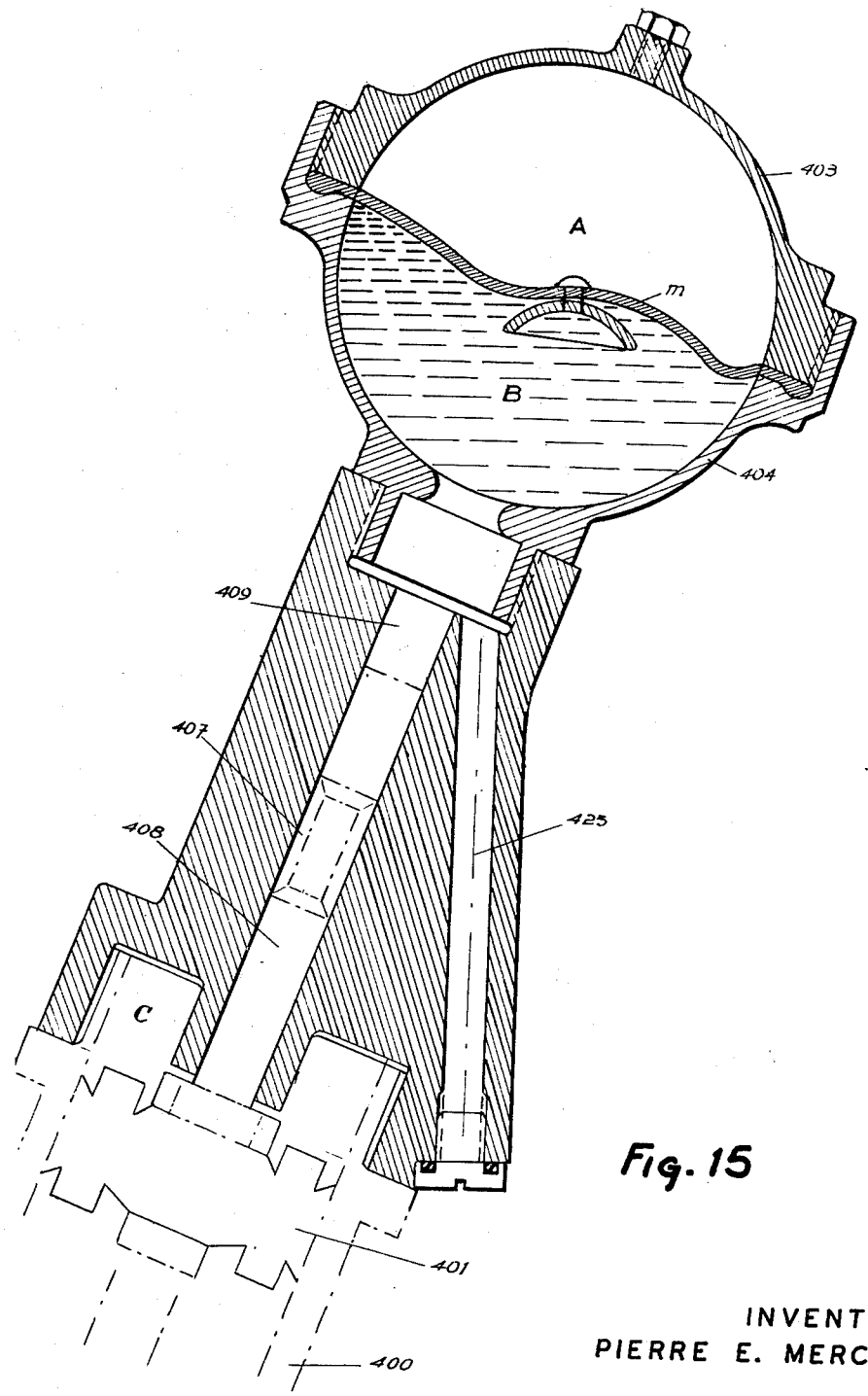
Figure 15 is a cross-sectional view of the upper portion of a suspension member taken on the section line V—V of Figure 14.

According to the alternative suspension proposed and shown in Figures 12, 13, 14, the suspension member is arranged for the most part along the general axis W—W. This essentially comprises, according to the invention, a mechanically distortable space C linked up to the suspended mass and formed by the cylinder-piston assembly 400—401, in relation with a principal resilient mass A housed in a spherical container in two parts 403—404. The resilient mass A is separated from the liquid situated in the container B by the membrane M.

Between the spherical container 403—404, which corresponds to the assembly I mentioned above and the cylinder-piston assembly 400—401, which corresponds to the assembly II, there is inserted a damping member designated above by III and which may be seen in the center of Figure 13.

The suspension member also comprises a second spherical container in two parts 405—406 internally separated by the membrane 407 and in which there is provided a pilot container A' full of gas.

The second spherical container 405—406 is arranged according to an axis TT orthogonal to the general axis WW, whereas the flap-valve unit of the damping member is arranged according to an axis AA parallel to TT and situated in a plane parallel to WW.

In the example shown, the interrupting member is formed by a plunger slide-valve 408, integral with the piston 401 and centered on the axis WW. This moves in the channel 409 drilled in the head 410 of the suspension members.

The flap-valve-holder unit of the damping member is housed in a housing provided along the axis AA in the head 410 and closed by a cupola 411. This unit comprises the flap-valve seats 412—413 separated by the cross-piece 414. The flap-valves themselves are made of flat washers 415—416 returned to their seats by a conical spring 417. They open towards the interior of the flap-valve-holder unit.

The double valve and its piston are marked 418—419. In the example considered, the double valve is formed by a system of two flat washers separated by a cross sleeve, the whole mounted on a shaft which traverses the piston from one side to the other and is integral with the latter with a certain amount of resilience thanks to a rubber ring device 420. The double valve 418 is returned to its mean position by springs 421—422.

The circuits are established by means of borings provided in the head 410 and may be classified in the following manner:

*Pilot container circuit.*—The liquid situated in front of the membrane 407 and subjected to the action of the gas of the pilot container A', is in communication with the chamber of the cylinder where the piston 419 of the double valve 418 moves, through the intermediary of the piping 424 perpendicular to WW and by the piping 425 shown by a single dotted line in Figure 13. This piping traverses the chamber 423.

The liquid subjected to the gas of the pilot container A' is also in communication with the liquid of the chamber B of the principal resilient container 403—404 through the intermediary of the ducts 426 and 427.

A valve-needle 428 enables the inter-communication leakage through the duct 427 to be regulated.

*Damping member circuit.*—The liquid situated in the cylinder 400 above the piston 401 is admitted into the annular chamber 429 of the flap-valve-holder unit by a duct 430 parallel to TT and by the duct 431 parallel to WW. The annular chamber 429 communicates freely with the chamber 432 of the flap-valve-holder unit. The chamber 433 opposite to the preceding one is in communication with the container B of the principal resilient member through the duct 434. This duct 434 is extended towards the piston 401 and emerges in the duct 435. The latter traverses the cylinder 409 of the plunger slide-valve and emerges at 436 in the point of the intercommunication tube of the suspension member and the auxiliary resilient containers.

The annular chamber situated in the cylinder 400 above the piston 401 is in communication with the exterior of the suspension member through the point 222 as in the case of the example shown in Figure 4.

In the example considered, the plunger 409 comprises a neck 437 which enables it to establish communication between the point 436 and the container B when it is facing the duct 435.

The point 436 corresponds with a piping which is connected, or connects the suspension member to at least one auxiliary resilient container not shown.

According to the shape and position of the reduction of section 437, desirable variation laws of resilient characteristics may be obtained.

The working of a suspension comprising this suspension member may be easily understood from the foregoing explanation. When the piston 401, connected, for example, to the wheel, occupies a mean position in its cylinder 400, the slide-valve 408, integral with this piston, offers its notch 437 in front of the piping 435 and thus allows a free communication between the liquid mass of the suspension member and that of the other resilient containers with which this member is coupled up. In this case, the flexibility of the suspension is that which results from the conditions in which the coupling up of the various suspension members is effected.

On the other hand, when the piston 401 approaches the end of its stroke, the slide-valve 408 obstructs the piping 435 which terminates in the point 436. In this case, the liquid mass situated inside the suspension member is isolated and the flexibility of the suspension is then that of the suspension member itself.

The flexibility of the suspension element interpreted graphically presents in a median portion of the cam a certain slope for as long a time as the slide 408 is not in action and an increasing slope is obtained at the end of the travel of the piston after interruption of the communication.

It is to be remarked that according to the form and the position of the throat 437 one can realize the desired elastic characteristics.

It should be noticed that according to the shape and position of the neck 437, the desired resilient characteristics of the shapes can be obtained.

Another form of embodiment of a suspension member is shown in Figure 17. Whereas in the previous one (Figure 12) the resilient pilot container 406—405 is placed substantially in the extension of the damping member whose axis is AA, it is placed in this new embodiment at a point opposite along the axis KK.

Starting from this arrangement, a suspension member can also be produced in which the principal resilient container 403—404 is placed laterally in substantial opposition to the resilient pilot container. The space occupied upwards is thus reduced. All other arrangements could be selected for meeting requirements particularly applied to reducing space occupied.

Lastly, two forms of embodiment of the link between the piston 401 and the slide valve 408, should be noted.

In the case of Figure 12, the slide-valve 408 is directly linked up to the piston rod, but the piston head is mounted with a slight lateral play on this rod, so as to take up possible defects in the alignment of the members along the general axis WW. Moreover, the piston rod 401 has a knuckle fitting on the lower rod 438.

Figure 16:
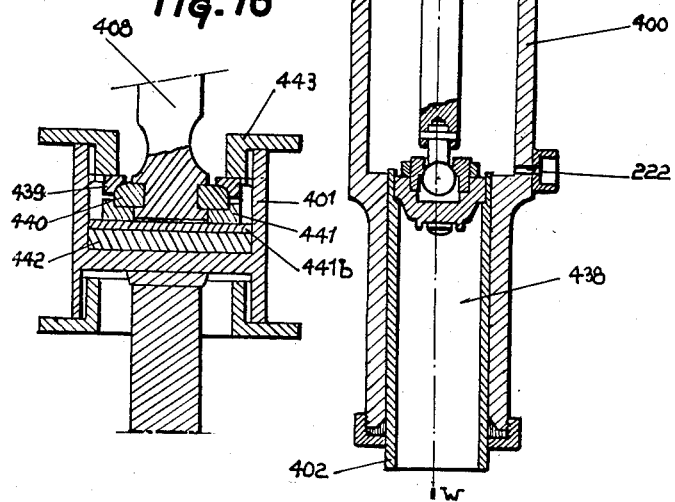
Figure 16 is a cross sectional view of a modified connection between the slide valve and the piston of a suspension member.

In the alternative shown in Figure 16, the slide-valve 408 is connected to the piston 401 by two rings 439—440 with spherical bearing. The lower ring in two parts 440 rests in a cupola 441 bearing on a rubber washer through the intermediary of the flat washer 441b. The assembly is secured by a nut 443. This system forms a knuckle by means of the rings 440—439 and allows of a relative lateral displacement between the piston rod and the slide-valve. The knuckle of Figure 12 could thus be eliminated, the piston rod being directly connected to the lower hollow piston 402, integral with the movement of the wheels.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

What I claim is:

1. An arrangement for absorbing shocks particularly for a vehicle comprising a mechanically deformable space formed by two portions displaceable with relation to one another, means connecting one of said portions to the suspended mass, means connecting the other portion to the wheel members, an elastic agent in two spaced compartments, a liquid capacity also in two spaced compartments subjected to the thrust of said elastic agent, a damping element interposed between said deformable space and said liquid capacity controlling the displacement of the liquid leaving or entering said deformable space, said liquid capacity in one of said compartments communicating directly with said damping element braking the return to equilibrium of said suspended mass and in the other compartment communicating with said mechanically deformable space through throttled passages, said liquid capacity in said other compartment being a chamber securing by means of said throttled passages of communication the average pressure of equilibrium prevailing in the suspension arrangement.

2. An arrangement for absorbing shocks particularly for a vehicle comprising a mechanically deformable space formed by two portions displaceable with relation to one another, means connecting one of said portions to the suspended mass, means connecting the other portion to the wheel members, an elastic agent in two spaced compartments, a liquid capacity also in two spaced compartments subjected to the thrust of said elastic agent, a damping element interposed between said deformable space and said liquid capacity controlling the displacement of the liquid leaving or entering said deformable space, said liquid capacity in one of said compartments communication the average pressure of equilibrium preing the return to equilibrium of said suspended mass and in the other compartment communicating with said mechanically deformable space through throttled passages, said liquid capacity in said other compartment being a chamber securing by means of said throttled passages of communication the average pressure of equilibruim prevailing in the suspension arrangement, said damping element comprising a double action piston provided with a throttling arrangement across a variable adjustment for the liquid driven back by said piston.

3. An arrangement for absorbing shocks particularly for a vehicle comprising a mechanically deformable space formed by two portions displaceable with relation to one another, means connecting one of said portions to the suspended mass, means connecting the other portion to the wheel members, an elastic agent in two spaced compartments, a liquid capacity also in two spaced compartments subjected to the thrust of said elastic agent, a damping element interposed between said deformable space and said liquid capacity controlling the displacement of the liquid leaving or entering said deformable space, said liquid capacity in one of said compartments communicating directly with said damping element braking the return to equilibrium of said suspended mass and in the other compartment communicating with said mechanically deformable space through throttled passages, said liquid capacity in said other compartment being a chamber securing by means of said throttled passages of communication the average pressure of equilibrium prevailing in the suspension arrangement, said damping element comprising a block, a double valve plate mounted on said block and flap one way valves opening towards the interior of said block carrying the valves.

4. An arrangement for absorbing shocks particularly for a vehicle comprising a mechanically deformable space formed by two portions displaceable with relation to one another, means connecting one of said portions to the suspended mass, means connecting the other portion to the wheel members, an elastic agent in two spaced compartments, a liquid capacity also in two spaced compartments subjected to the thrust of said elastic agent, a damping element interposed between said deformable space and said liquid capacity controlling the displacement of the liquid leaving or entering said deformable space, said liquid capacity in one of said compartments communicating directly with said damping element braking the return to equilibrium of said suspended mass and in the other compartment communicating with said mechanically deformable space through throttled passages, said liquid capacity in said other compartment being a chamber securing by means of said throttled passages of communication the average pressure of equilibrium prevailing in the suspension arrangement, said chamber and said first named compartment of said liquid capacity being located laterally with relation to said suspension element in different planes forming an angle with it.

5. An installation for the suspension of a vehicle comprising a plurality of suspension elements comprising each a cylinder, a double action piston movable in said cylinder delimiting two inversely deformable spaces, an elastic agent, a capacity containing a liquid subjected to the pressure of said elastic agent, a damping element interposed between said capacity and one of said deformable spaces located in advance of said piston, said inversely deformable spaces delimited by the piston of two of said suspension elements corresponding to a pair of wheels of the vehicle being cross interconnected and an additional flexible element located across said suspension elements comprising a capacity containing a compressed gas acting upon a liquid, a staged piston delimiting chambers simultaneously individually variable connected to distinct groups of suspension elements by canals comprising throttling elements for said liquid.

6. An installation for the suspension of a vehicle comprising a plurality of suspension elements comprising each a cylinder, a double action piston movable in said cylinder delimiting two inversely deformable spaces, an elastic agent, a capacity containing a liquid subjected to the pressure of said elastic agent, a damping element interposed between said capacity and one of said deformable spaces located in advance of said piston said inversely deformable spaces delimited by the piston of two of said suspension elements corresponding to a pair of wheels of the vehicle being cross interconnected and a complementary flexible element comprising twin staged pistons delimiting simultaneously variable chambers separated into two symmetrical groups inversely variable, each of the chambers constituting a group being connected by canals to one of said inversely deformable spaces of a distinct element of the suspension while the homologous chamber of another group, connected in a similar manner to an element of suspension symmetrical to the preceding with relation to an axis of the suspension and capacities acting in opposition upon said twin staged pistons.

7. An installation for the suspension of a vehicle comprising a plurality of suspension elements comprising each a cylinder, a double action piston movable in said cylinder delimiting two inversely deformable spaces, an elastic agent, a capacity containing a liquid subjected to the pressure of said elastic agent, a damping element interposed between said capacity and one of said deformable spaces located in advance of said piston, said inversely deformable spaces delimited by the piston of two of said suspension elements corresponding to a pair of wheels of the vehicle being cross interconnected, a free banking control comprising twin staged pistons delimiting chambers simultaneously variable separated into two symmetrical groups inversely variable, each of said chambers constituting a group being connected by a canal to one of said mechanically deformable spaces of a distinct suspension element and being symmetrical with relation to the center of the chassis while the homologous chamber of another group is connected in a similar manner to a suspension element symmetrical to the preceding with relation to an axis of the suspension, the displacements of said twin pistons being subject to springs of slight power recalling said pistons into median position at the moment of filling the circuits.

8. An installation for the suspension of a vehicle comprising a plurality of suspension elements comprising each a cylinder, a double action piston movable in said cylinder delimiting two inversely deformable spaces, an elastic agent, a capacity containing a liquid subjected to the pressure of said elastic agent, a damping element interposed between said capacity and one of said deformable spaces located in advance of said piston, said inversely deformable spaces delimited by the piston of two of said suspension elements corresponding to a pair of wheels of the vehicle being cross interconnected, a free banking control comprising twin staged pistons delimiting chambers simultaneously variable separated into two symmetrical groups inversely variable, each of said chambers constituting a group being connected by a canal to one of said mechanically deformable spaces of a distinct suspension element and being symmetrical with relation to the center of the chassis while the homologous chamber of another group is connected in a similar manner to a suspension element symmetrical to the preceding with relation to an axis of the suspension, the displacements of said twin pistons being controlled by a hydraulic servo-motor controlled by a pendulum oscillating about a horizontal axis parallel to the longitudinal axis of the vehicle.

9. An installation for the suspension of a vehicle comprising a plurality of suspension elements comprising each a cylinder, a double action piston movable in said cylinder delimiting two inversely deformable spaces, an elastic agent, a capacity containing a liquid subjected to the pressure of said elastic agent, a damping element interposed between said capacity and one of said deformable spaces located in advance of said piston, said inversely deformable spaces delimited by the piston of two of said suspension elements corresponding to a pair of wheels of the vehicle being cross interconnected, and an additional element of flexibility placed across the suspension elements comprising a capacity whose liquid is in communication with the liquid mass of the suspension elements, the pressure prevailing in said capacity being controlled by decanting of liquid operated by a hydraulic servo control assuring longitudinal seating of the suspension.

10. An installation for the suspension of a vehicle comprising a plurality of suspension elements comprising each a cylinder, a double action piston movable in said cylinder delimiting two inversely deformable spaces, an elastic agent, a capacity containing a liquid subjected to the pressure of said elastic agent, a damping element interposed between said capacity and one of said deformable spaces located in advance of said piston, said inversely deformable spaces delimited by the piston of two of said suspension elements corresponding to a pair of wheels of the vehicle being cross interconnected and an additional element of flexiblity placed across the suspension elements comprising a capacity whose liquid is in communication with the liquid mass of said suspension elements, the pressure prevailing in said capacity being controlled by the admission or evacuation of liquid arriving or returning by a hydraulic control assuring longitudinal seating of the suspension.

11. An installation for the suspension of a vehicle comprising a plurality of suspension elements comprising each a cylinder, a double action piston movable in said cylinder delimiting two inversely deformable spaces, an elastic agent, a capacity containing a liquid subjected to the pressure of said elastic agent, a damping element interposed between said capacity and one of said deformable spaces located in advance of said piston, said inversely deformable spaces delimited by the piston of two of said suspension elements corresponding to a pair of wheels of the vehicle being cross interconnected and an additional element of flexibility placed across the suspension elements comprising a capacity whose liquid is in communication with the liquid mass of the suspension elements, the pressure prevailing in said capacity being controlled by decanting the liquid operated by a hydraulic servo control assuring the transverse seating of the suspension.

12. An installation for the suspension of a vehicle comprising a plurality of suspension elements comprising each a cylinder, a double action piston movable in said cylinder delimiting two inversely deformable spaces, an elastic agent, a capacity containing a liquid subjected to the pressure of said elastic agent, a damping element interposed between said capacity and one of said deformable spaces located in advance of said piston, said inversely deformable spaces delimited by the piston of two of said suspension elements corresponding to a pair of wheels of the vehicle being cross interconnected, and an additional element of flexibility placed across the suspension elements comprising a capacity whose liquid is in communication with the liquid mass of the suspension elements, the pressure prevailing in said capacity being controlled by the admission or evacuation of liquid arriving or returning under a hydraulic control assuring the transverse seating of the suspension.

13. An installation for the suspension of a vehicle comprising a plurality of suspension elements comprising each a cylinder, a double action piston movable in said cylinder delimiting two inversely deformable spaces, an elastic agent, a capacity containing a liquid subjected to the pressure of said elastic agent, a damping element interposed between said capacity and one of said deformable spaces located in advance of said piston, said inversely deformable spaces delimited by the piston of two of said suspension elements corresponding to a pair of wheels of the vehicle being cross interconnected, the ratio of the displacements of the movable element of one of said suspension elements with relation to the displacements of the wheel which corresponds thereto being mechanically variable under the control of a servo motor, controlled by the pressures of the elastic chamber symmetrically located at the point of their connection with relation to the transverse axis of the vehicle for the purpose of bringing back the transverse axis of oscillation into a vertical plane containing the center of gravity of the suspended mass.

14. A suspension installation for a vehicle comprising a plurality of suspension elements allocated to the wheels and interconnected, said suspension elements comprising each a mechanically deformable space formed by two portions displaceable with relation to one another, means connecting one of said portions to the suspended mass, means connecting the other portion to the wheel members, an elastic agent in two spaced compartments, a liquid capacity also in two spaced compartments subjected to the thrust of said elastic agent, a damping element interposed between said deformable space and said liquid capacity controlling the displacement of the liquid leaving or entering said deformable space, said liquid capacity in one of said compartments communicating directly with said damping element braking the return to equilibrium of said suspended mass and in the other compartment communicating with said mechanically deformable space through throttled passages, said liquid capacity in said other compartment being a chamber securing by means of said throttled passages of communication the average pressure of equilibrium prevailing in the suspension arrangement and means for interrupting near the end of travel the communication between the coupled elastic agents and the corresponding element of suspension.

15. A suspension installation for a vehicle comprising a plurality of suspension elements allocated to the wheels and interconnected, said suspension elements comprising each a mechanically deformable space formed by two portions displaceable with relation to one another, means connecting one of said portions to the suspended mass, means connecting the other portion to the wheel members, an elastic agent in two spaced compartments, a liquid capacity also in two spaced compartments subjected to the thrust of said elastic agent, a damping element interposed between said deformable space and said liquid capacity controlling the displacement of the liquid leaving or entering said deformable space, said liquid capacity in one of said compartments communicating directly with said damping element braking the return to equilibrium of said suspended mass and in the other compartment communicating with said mechanically deformable space through throttled passages, said liquid capacity in said other compartment being a chamber securing by means of said throttled passages of communication the average pressure of equilibrium prevailing in the suspension arrangement, a slide valve modulating the intercommunication between said liquid capacity of the elastic agent of one of said suspension elements and a branch of tubing connecting said suspension element to other elastic agents with which it is normally coupled.

16. An installation for the suspension of a vehicle comprising a plurality of suspension elements comprising each a cylinder, a double action piston movable in said cylinder delimiting two inversely deformable spaces, an elastic agent, a capacity containing a liquid subjected to the pressure of said elastic agent, a damping element interposed between said capacity and one of said deformable spaces located in advance of said piston, said inversely deformable spaces delimited by the piston of two of said suspension elements corresponding to a pair of wheels of the vehicle being cross interconnected, a slide valve arrangement modulating the intercommunication between said liquid chamber of the elastic agent of one of said suspension elements and a branch of the tubing connecting said suspension element to the other elastic agents with which it is normally coupled, said slide valve being fixed directly to the piston of the cylinder piston assembly which constitutes the mechanically deformable space of the suspension element.

17. A suspension installation for a vehicle comprising a plurality of suspension elements allocated to the wheels and interconnecting said suspension elements comprising each a mechanically deformable space formed by two portions displaceable with relation to one another, means connecting one of said portions to the suspended mass, means connecting the other portion to the wheel members, an elastic agent in two spaced compartments, a liquid capacity also in two spaced compartments subjected to the thrust of said elastic agent, a damping element interposed between said deformable space and said liquid capacity controlling the displacement of the liquid leaving or entering said deformable space, said liquid capacity in one of said compartments communicating directly with said damping element braking the return to equilibrium of said suspended mass and in the other compartment communicating with said mechanically deformable space through throttled passages, said liquid capacity in said other compartment being a chamber securing by means of said throttled passages of communication the average pressure of equilibrium prevailing in the suspension arrangement, a slide valve modulating the intercommunication between the liquid capacity of one of the suspension elements and a branch of tubing connecting said suspension element to the other elastic agents with which it is normally coupled, a piston movable in a cylinder forming said deformable space, said slide valve being fixed to said piston by a plane spherical support segment inserted between a plane support and a plane cup supported upon a metallic disc separated from said piston by a disc.

18. A suspension device for a vehicle or other application comprising a plurality of suspension elements, each comprising a cylinder, a double acting piston movable in said cylinder delimiting two inversely deformable spaces of capacity containing liquid subjected to the pressure of an elastic element, a damping element intercalated between said capacity and a deformable space controlling the displacements of the liquid leaving or entering into the mechanically deformable space, said capacity containing the liquid comprising a first portion subjected to the thrust of an elastic agent, said portion communicating directly with said damping element braking the return to equilibrium of the suspended mass and a second portion subjected to the thrust of an elastic agent, said second portion communicating with the mechanically deformable space through restricted passages, said second portion called a "pilot capacity" causing by means of said restricted passages of communication the average pressure of equilibrium prevailing in the suspension device, said inversely deformable spaces delimited by the piston of two of said elements of suspension corresponding to a pair of wheels of the vehicle being cross interconnected, and an additional flexible element connected to the suspension elements comprising a hydro pneumatic oil capacity whose liquid is in communication with the liquid mass of the suspension elements and the throttling elements of said liquid.

19. A suspension device for a vehicle comprising a plurality of suspension elements each comprising a cylinder, a double acting piston movable in said cylinder delimiting two inversely deformable spaces, a capacity containing a liquid subjected to the pressure of an elastic agent, a damping element intercalated between said capacity and the deformable spaces controlling the displacements of the liquid entering or leaving the mechanical deformable space, said capacity containing the liquid, comprising a first portion subjected to the thrust of an elastic agent, said portion communicating directly with said damping element braking the return to equilibrium of the suspended mass and a second portion subjected to the thrust of an elastic agent, said second portion communciating with the mechanically deformable space through restricted passages, said second portion called the "pilot capacity" causing because of said restricted communication passages the average pressure of equilibrium prevailing in the suspension device, said inversely deformable spaces delimited by the piston of two of said suspension elements corresponding to a pair of wheels of the vehicle being cross interconnected, the ratio of the displacements of the movable element of one of the suspension elements with relation to the displacements of the wheel to which it corresponds being mechanically variable under the control of a servo-motor reestablishing longitudinal position of the vehicle.

(References on following page)

References Cited in the file of this patent

UNITED STATES PATENTS

| | | |
|---|---|---|
| 2,073,180 | Rink | Mar. 9, 1937 |
| 2,124,124 | Schoepf | July 19, 1938 |
| 2,593,040 | Lloyd | Apr. 15, 1952 |
| 2,620,182 | Marston | Dec. 2, 1952 |
| 2,684,254 | Goss | July 20, 1954 |
| 2,812,954 | Lyon | Nov. 12, 1957 |
| 2,828,138 | Brueder | Mar. 25, 1958 |

FOREIGN PATENTS

| | | |
|---|---|---|
| 363,811 | Great Britain | Dec. 31, 1931 |
| 1,030,729 | France | Mar. 18, 1953 |